Dec. 8, 1942.  L. W. WILLIAMS  2,304,618
FILTER
Filed Dec. 26, 1940  2 Sheets-Sheet 1
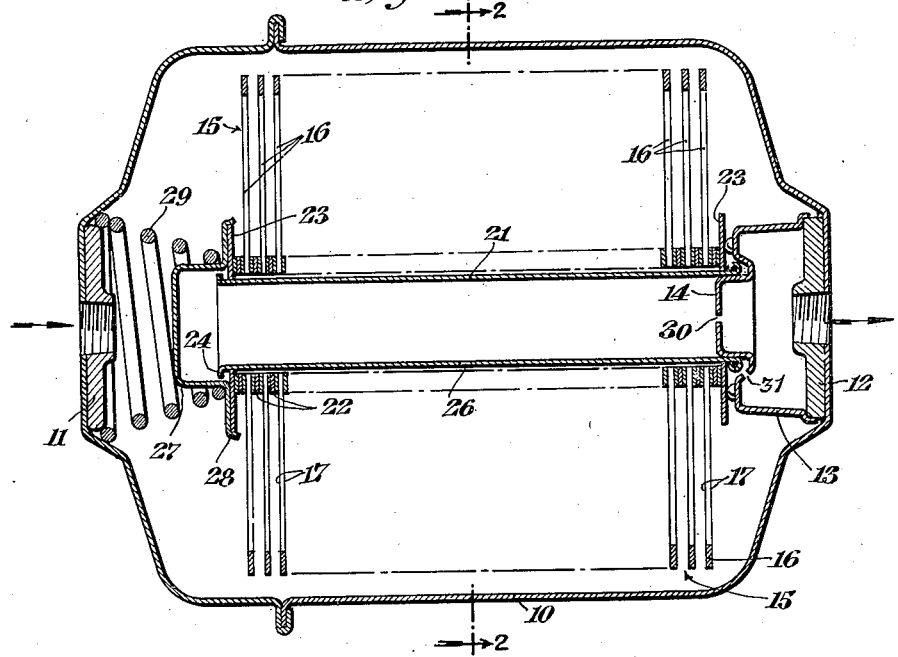
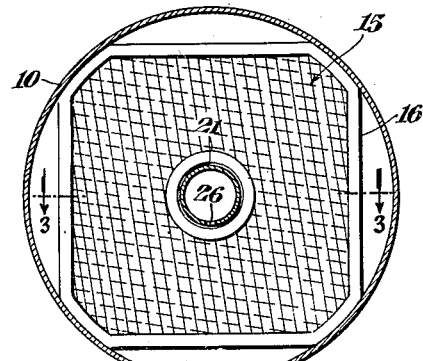
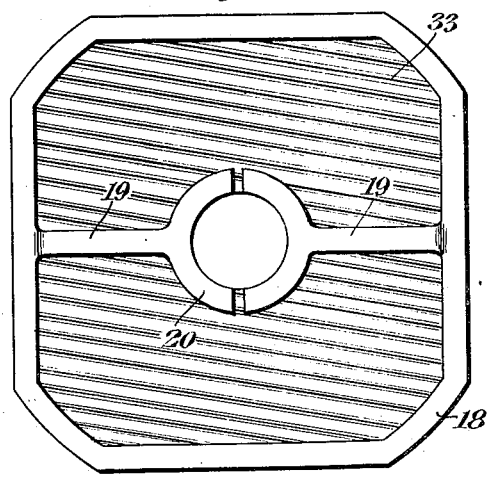
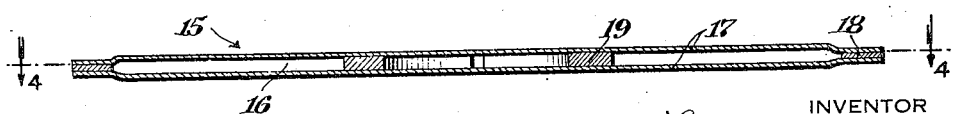
INVENTOR
Lewis W. Williams
BY Kenyon & Kenyon
ATTORNEYS Dec. 8, 1942.  L. W. WILLIAMS  2,304,618
FILTER
Filed Dec. 26, 1940   2 Sheets-Sheet 2
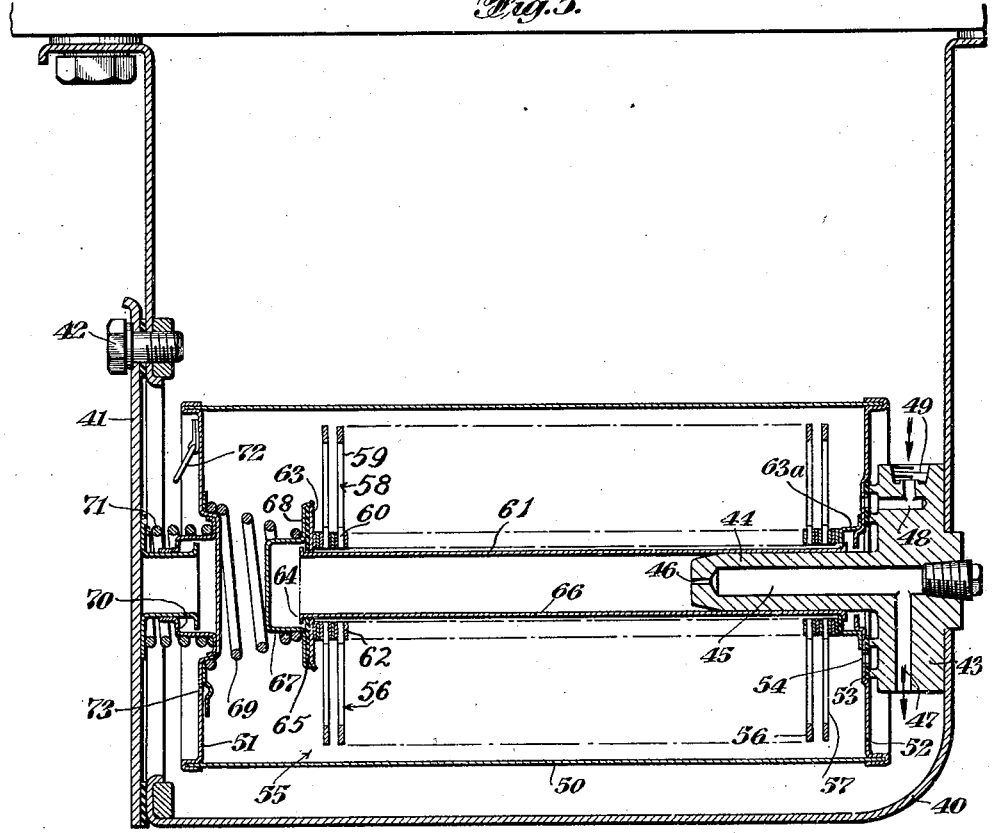
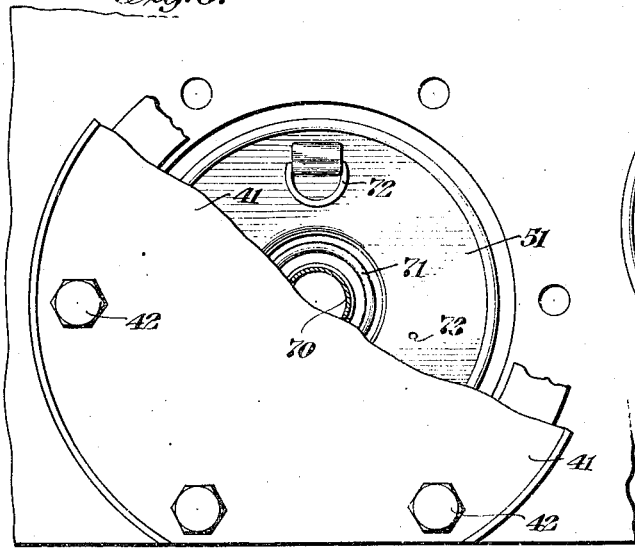
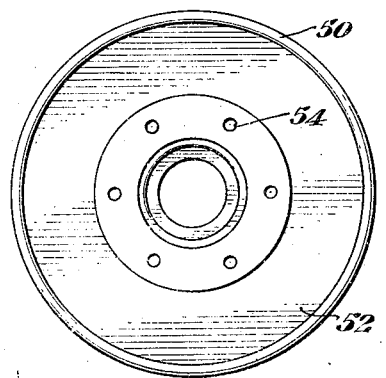
INVENTOR
Lewis W. Williams
BY Kenyon & Kenyon
ATTORNEYS Patented Dec. 8, 1942

2,304,618

UNITED STATES PATENT OFFICE 2,304,618

FILTER

Lewis W. Williams, Short Hills, N. J., assignor to PurOlator Products, Inc., Newark, N. J., a corporation of Delaware Application December 26, 1940, Serial No. 371,620

4 Claims. (Cl. 210—181)

This invention relates to filters and more especially to filters particularly adapted for purifying the lubricant of an internal combustion engine.

An object of this invention is a filter of this character which is simple in construction, inexpensive to manufacture and is efficient in operation over a long period of time.

Other objects, novel features and advantages of this invention will become apparent from the following specification and accompanying drawings, wherein:

Fig. 1 is a longitudinal section through one embodiment of the invention;

Fig. 2 is a section on the line 2—2 of Fig. 1;

Fig. 3 is an enlarged section on the line 3—3 of Fig. 2.

Fig. 4 is a section substantially on the line 4—4 of Fig. 3;

Fig. 5 is a longitudinal section through a modified embodiment of the invention;

Fig. 6 is a side elevation partly broken away of Fig. 5 and

Fig. 7 is an elevation of one end of the filter.

Referring first to Figs. 1 to 4 inclusive, a generally cylindrical container 10 is provided at its ends with reenforcing disks 11 and 12 and each disk is provided with a tapped opening, the opening in the disk 11 constituting the inlet to the container and the opening in the disk 12 constituting the outlet therefrom. The disk 12 carries a support 13 in the shape of the frustum of a cone having a cylindrical portion 14 of less diameter than the main portion of said support.

The filter unit 15 consists of a plurality of filtering elements or leaves 16, each of which is composed of two thin sheets 17 of paper or other porous fibrous material treated with a thermoplastic and hardened in accordance with the procedure described in the patent to Wells, No. 2,103,572. As shown in Fig. 2, the two sheets are of generally square configuration with rounded corners which are of substantially the same diameter as the diameter of the container 10. The sheets 17 are cemented together along their peripheral edges with a suitable thermo-plastic and each sheet is provided with a central opening. Between the two sheets is arranged a drainage member 18 (Fig. 3), the exterior configuration of which conforms to that of the sheets. The drainage member preferably is composed of fibrous material such for example as paper impregnated with a thermo-plastic. The interior portion of the drainage member 18 is open except for two radial arms 19 terminating in semicircular portions 20, the interior diameter of which is the same as the interior diameter of the apertures in the disks and the opposing ends of said portion being slightly spaced. The narrow exterior rim portion of the drainage member 18 is interposed between the edges of the disks 17 and both of the disks are cemented thereto.

The leaves 16 are mounted on a tube 21 of slightly less cross-section than the aperture in the sheets passing through said apertures and spacing members 22 are provided at opposite sides of each leaf, each spacing member being cemented to the outer face of a sheet 17. A metal washer 23 is provided at each end of the tube 21 in contact with the outermost spacing member 22 and each end of the tube 21 is flanged outwardly at 24 to hold the washers 23 in place and complete the assembly of the filter unit. One or more apertures 26 is provided in the tube 21 to permit oil flow thereinto. The right end of the tube 21 fits over the portion 14 of the support 13 and is held in such position by means later to be described.

A cap 27 has a flange 28 which engages the washer 23 at the left end of the tube 21 (Fig. 1). A helical spring 29 is supported at one end by the reenforcing member 11 and its other end surrounds and supports the cap 27. The spring 29 exerts pressure on the cap 27 to force it against the gasket 25 thereby holding the filtering unit 15 in position and also forming an oil-tight seal between the cap and the washer 23.

An orifice 30 is provided in the portion 14 to establish communication between the interior of the tube 21 and the outlet port in the reenforcing member 12. Also, an orifice 31 of much smaller diameter than the orifice 30 is provided in the wall of the support 13 to provide communication between the interior of the container 10 and the outlet port. Small projections 32 are provided on the support 13 for engagement with the washer 23 to permit flow to the orifice 31. The function of the aperture 31 is to by-pass a small amount of hot oil in heat exchange relation to the oil in the filter to prevent the filter being inoperative due to congealed oil therein. This feature is fully described in the U. S. patent to Redner, No. 1,969,033 with respect to the aperture 25 in the filter disclosed in said patent.

As shown in Fig. 4, each disk 17 is provided with parallel corrugations 33. The corrugations of one leaf preferably are arranged to cross the corrugations of the remaining leaf at an angle in the neighborhood of 90° (Fig. 2). This arrangement of corrugations strengthens the disks and facilitates drainage of oil from the interior of the leaf.

In the operation of the filter just described, oil to be filtered is introduced into the container 10 through the inlet port in the reenforcing member 11 and flows around the filtering unit to fill the container. The filtering unit is in contact with the container only along the edges of the curved corners of the unit so that passageways are provided for the flow of oil from one end of the container to the other and between the leaves. The oil passes through the sheets 17 into the interior of the leaves and from the interior of the leaves it escapes through the opening between the ends of the semi-circular portions 20 of the drainage member 18 into the space around the tube 21. The filtered oil then flows into the interior of the tube 21 through the apertures 26 and from the interior of the tube the filtered oil flows through the orifice 30 to the outlet in the reenforcing member 12. A small amount of unfiltered oil is by-passed around the filtering element through the orifice 31 for the purpose described in said Redner patent.

In the event that any shrinkage develops in the spacing members 22, the semi-circular portions 20 of the drainage member or in the disks 17, such shrinkage is compensated for by inward movement of the left-hand washer 23 under the influence of the spring 29. Thus, any possibility of leakage of unfiltered oil into the tube 21 is prevented.

In Figs. 5 to 7 inclusive is illustrated a modified form of filter unit arranged in the oil pan of an internal combustion engine. In this modification, 40 designates the oil pan in one vertical wall of which is provided an opening normally closed by a cover 41 held in place by bolts 42. A fitting 43 is permanently attached to the opposite vertical wall of the oil pan 40 and is provided with a projection 44 extending toward the interior of the oil pan. In the projection 44 is provided a passageway 45 terminating at one end in an orifice 46 and having a downwardly extending portion 47. A second passageway 48 is provided in the fitting 43 and terminates at one end in a threaded socket 49. A cylindrical container 50 is provided with closures 51 and 52 and in the end member 52 is provided an annular reenforcing member 53 having apertures alined with apertures in the end member 52 to provide inlet ports 54 for the container.

The filtering unit 55 consists of filtering leaves 56 composed of sheets 57 and in each leaf is provided a drainage member 58, such drainage member having inwardly projecting arms 59 terminating in semi-circular portions 60 so that the unit 55 is similar in all respects to the filtering unit 15 previously described. The leaves 56 are supported by a tube 61 and spacers 62 are arranged on both sides of each leaf. At the left end of the tube 61 is provided a washer 63 and at the right end of the tube 61 is provided a collar 63a, each of which engages the outermost spacing member 62 at its end of the tube and each of which is held in place by a flange 64 turned outwardly at each end of the tube. The collar 63a is fixed to the end 52 of the container 50.

One or more apertures 66 are provided in the tube 61 for directing flow of oil into the interior of such tube. A cap 67 has a flange 68 engaging the gasket 65. A helical spring 69 is attached at one end to the end member 61 and its other end surrounds and supports the cap 67. This spring serves the same function as the spring 29 previously described.

The container 50 is arranged with the projection 44 received in the tube 61 and is held in such position by means now to be described. A telescoping member 70 is supported at one end by the cover member 41 and its other end is seated in a depression formed in the end member 51. A helical spring 71 tends to expand the telescoping member 70 to maintain its inner end in contact with the end member 51 and urge the container 50 to the right. When it is desired to replace the filter, the cover 41 is removed and the container 51 is withdrawn through the side wall opening by means of the handle 62 and a new filter inserted in the same position as formerly occupied by the removed filter. The cover 41 is then replaced completing the assembling of the filter with the circulating system.

In the operation of the filter just described, oil is introduced into the inlet 49 through the medium of piping (not shown) and passes through the passageway 48 and ports 54 into the interior of the container 50 where it is distributed around the filter leaves. After passage of the oil through the filter leaves, the filtered oil escapes into the tube 61 through the apertures 66 and passes therefrom through the orifice 46 into the outlet passages 45 and 47 and to the interior of the oil pan. An orifice 73 is provided in the end member 51 to provide for a slight by-pass of oil as previously described, this orifice being of much smaller diameter than the outlet orifice 46.

It is of course understood that various modifications may be made in the structure above described without in any way departing from the spirit of the invention as defined in the appended claims.

I claim:

1. A filtering unit comprising a plurality of two-wall fluid-permeable filter leaves with each wall having a central aperture, a perforated tube passing through said apertures, separators on said tube between adjacent leaves, a spacer interposed between and sealed to the adjacent walls of each leaf at the outer edges thereof, a pair of arms extending inwardly from said spacer in radial arrangement with respect to said apertures, each arm terminating in a substantially semi-circular portion concentric with said apertures and having the opposing ends of said portions slightly spaced to form drainage outlets, and means for maintaining said leaves in assembled relation on said tube.

2. A filtering element comprising a pair of fluid penetrable sheets having aligned apertures, a spacer interposed between and sealed to said sheets at the outer edges thereof, and a pair of arms extending inwardly from said spacer in radial arrangement with respect to said apertures and each arm terminating in a substantially semi-circular portion concentric with said apertures and having the opposing ends of said portions slightly spaced to form drainage outlets.

3. A filter comprising a container having an inlet and an outlet, an abutment in said container having a projection equipped with a passageway communicating with said outlet, a perforated tube supported at one end by said abutment with the tube slidably receiving said projection and communicating with said passageway, a pair of relatively movable washers carried by said tube at opposite ends thereof, a flange at each end of said tube engageable by a washer, a plurality of two-wall fluid-permeable filter leaves mounted on said tube between said washers, each leaf having a passageway through which said tube passes and having an outlet communicating with said passageway, separators on said tube between adjacent filter leaves and resilient means supported by said container independently of said tube and urging one washer toward the other and both washers toward said abutment.

4. A filter comprising a container having an inlet and an outlet, an abutment in said container having an opening communicating with said outlet, a perforated tube supported at one end by said abutment with the tube interior communicating with said outlet, a pair of relatively movable washers carried by said tube at opposite ends thereof, a plurality of two-wall fluid-permeable filter leaves mounted on said tube between said washers, each wall having an aperture through which said tube passes, a spacer interposed between and sealed to said walls at the outer edge thereof, a pair of arms extending inwardly from said spacer in radial arrangement with respect to said apertures, each arm terminating in a substantially semi-circular portion concentric with said apertures and having the opposing ends of said portions slightly spaced to form drainage outlets, separators on said tube between adjacent filter leaves and resilient means supported by said container independently of said tube and urging one washer toward the other and both washers toward said abutment.

LEWIS W. WILLIAMS.